US009176643B2

(12) United States Patent
Elia et al.

(10) Patent No.: US 9,176,643 B2
(45) Date of Patent: Nov. 3, 2015

(54) METHOD AND SYSTEM FOR PLAYING VIDEO

(75) Inventors: Eric J. Elia, Philadelphia, PA (US); Leslie A. Kelly, Columbia, MD (US); Jeremy C. Landis, Philadelphia, PA (US); Kevin M. Langdon, Philadelphia, PA (US); Salve Retuta, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1845 days.

(21) Appl. No.: 10/847,198

(22) Filed: May 17, 2004
(Under 37 CFR 1.47)

(65) Prior Publication Data

US 2005/0010955 A1 Jan. 13, 2005

Related U.S. Application Data

(60) Provisional application No. 60/471,018, filed on May 15, 2003.

(51) Int. Cl.
*H04N 7/173* (2011.01)
*G06F 3/0482* (2013.01)
*H04N 21/43* (2011.01)
*H04N 21/433* (2011.01)
*G06F 17/30* (2006.01)
*H04N 5/445* (2011.01)

(52) U.S. Cl.
CPC ........ *G06F 3/0482* (2013.01); *G06F 17/30849* (2013.01); *H04N 21/4307* (2013.01); *H04N 21/4332* (2013.01)

(58) Field of Classification Search
USPC ......... 715/835, 838, 787, 834, 719–722, 767, 715/856; 725/44, 43, 37–38, 41
See application file for complete search history.

(56) References Cited

U.S. PATENT DOCUMENTS

| 5,477,262 | A | * | 12/1995 | Banker et al. | 725/38 |
| 5,524,196 | A | * | 6/1996 | Blades | 715/834 |
| 5,724,492 | A | * | 3/1998 | Matthews et al. | 345/419 |
| 5,818,439 | A | | 10/1998 | Nagasaka et al. | |
| 5,900,868 | A | * | 5/1999 | Duhault et al. | 725/42 |
| 5,973,692 | A | * | 10/1999 | Knowlton et al. | 715/835 |
| 6,005,601 | A | * | 12/1999 | Ohkura et al. | 725/52 |
| 6,020,881 | A | * | 2/2000 | Naughton et al. | 715/740 |
| 6,188,398 | B1 | * | 2/2001 | Collins-Rector et al. | 725/37 |
| 6,397,387 | B1 | * | 5/2002 | Rosin et al. | 725/44 |
| 6,437,800 | B1 | * | 8/2002 | Malamud et al. | 715/711 |
| 6,448,987 | B1 | | 9/2002 | Easty et al. | |
| 6,456,334 | B1 | * | 9/2002 | Duhault | 348/565 |

(Continued)

FOREIGN PATENT DOCUMENTS

JP 2003-91345 3/2003

OTHER PUBLICATIONS

International Search Report, Feb. 27, 2007, 1 page.

(Continued)

*Primary Examiner* — Pankaj Kumar
*Assistant Examiner* — Reuben M Brown
(74) *Attorney, Agent, or Firm* — Banner & Witcoff, Ltd.

(57) ABSTRACT

A method and system for playing video on a graphical user interface (GUI) that provides a singular user interface for searching, retrieving, and playing video available over a network from a server.

34 Claims, 4 Drawing Sheets

(56) References Cited

U.S. PATENT DOCUMENTS

| | | | |
|---|---|---|---|
| 6,621,509 B1 * | 9/2003 | Eiref et al. | 715/836 |
| 6,934,690 B1 * | 8/2005 | Van Horn et al. | 705/26.2 |
| 6,938,218 B1 * | 8/2005 | Rosen | 715/850 |
| 7,036,091 B1 * | 4/2006 | Nguyen | 715/834 |
| 7,607,150 B1 * | 10/2009 | Kobayashi et al. | 725/41 |
| 7,653,707 B2 * | 1/2010 | Yoshimine | 709/219 |
| 7,996,791 B2 * | 8/2011 | Rashkovskiy | 715/838 |
| 2001/0028369 A1 * | 10/2001 | Gallo et al. | 345/848 |
| 2001/0030660 A1 | 10/2001 | Zainoulline | |
| 2002/0174425 A1 * | 11/2002 | Markel et al. | 725/13 |
| 2003/0070171 A1 | 4/2003 | Jeon et al. | |
| 2003/0106057 A1 * | 6/2003 | Perdon | 725/45 |
| 2004/0086268 A1 * | 5/2004 | Radha et al. | 386/111 |
| 2004/0095396 A1 | 5/2004 | Stavely et al. | |
| 2004/0250217 A1 * | 12/2004 | Tojo et al. | 715/810 |
| 2005/0210414 A1 * | 9/2005 | Angiulo et al. | 715/838 |
| 2007/0106956 A1 * | 5/2007 | Platt et al. | 715/808 |
| 2007/0283276 A1 * | 12/2007 | Neely et al. | 715/747 |

OTHER PUBLICATIONS

Office Action in Japanese Patent Application No. 2006-533170, dated Jun. 18, 2010 (with English translation).

Sawai, Takashi, Burrodobando jidai el: Sutoriimingu/muubi renkinjutsu ("Towards the Broadband Epochl: Streaming/Movie Alchemy"), Chapter 1: QuickTime Pro, Paso Vi, Japan, Genkosha Co., Mar. 20, 2001, Issue No. 0003, p. 73-76.

Office Action in Japanese Patent Application No. 2006-533170, mailed Oct. 26, 2010 (with English translation).

Office Action in Canadian Application No. 2,525,587 dated Jan. 18, 2012.

* cited by examiner

METHOD AND SYSTEM FOR PLAYING VIDEO

CROSS-REFERENCE TO RELATED APPLICATIONS

This application claims the benefit of U.S. provisional application Ser. No. 60/471,018 filed May 15, 2003.

BACKGROUND OF THE INVENTION

1. Field of the Invention

The present invention relates to a system and method for playing video, and in particular, to playing video with a graphical user interface (GUI).

2. Background Art

Numerous software programs exist for playing video over the internet on a personal computer. These systems generally require a user to log into a web-site and to select video for downloading or streaming to their personal computer. Such systems have a number of problems.

One problem relates to software compatibility. Many providers of video have proprietary software programs that may be incompatible with the software required to view a desired video. The software incompatibility can prevent viewing the video unless additional software is purchased or downloaded.

Another problem relates to a lack of computer resources. Some video view programs require one program to search and retrieve video and another separate program to play the video. The use of multiple programs consumes unnecessary computer resources.

Another problem relates to convenience. The searching and retrieving of video clips is often inconvenient because the content of the video is buried within a hyperlink such that time is lost in not only on clicking the hyperlink, but also on downloading the video. This is especially problematic if the hyperlink fails to provide an option to view only a sample image of the video prior to downloading. Moreover, additional pop-up windows are typically created for each link leading to further inconvenience of the user by requiring navigation through a number of pop-up windows before playing the video Another problem relates to lack of personalization. Users have personal tendencies to repeatedly search for particular types of video clips, however, some video search programs require inputting of search criteria each time a particular type of video clip is desired. The inability to personalize the searching inconveniences the user.

Accordingly, a need exists for a system and method of playing video which overcomes the above-identified deficiencies of the prior art.

SUMMARY OF THE INVENTION

The present invention contemplates a number of features, including a system for playing video that includes a computer for playing video received over a network from a server. The computer includes a graphical user interface (GUI) that permits a user to search, retrieve, and play video on the computer.

In one aspect of the present invention, the GUI communicates with the server to display thumbnail images associated with video available from the server. Each thumbnail is selectable for transferring video stored on the server to the computer for playing in a window of the GUI. The video automatically plays in the window of the GUI with selection of one of the thumbnails and without requiring the user to download or execute a separate video program on the computer.

Each thumbnail includes a graphical representation or other image associated with available video. The present invention contemplates the thumbnails having any number of different graphical representations, including an animated clip, a video frame, a static image, a textual description, a channel indicator, a title, and the like. The thumbnails provide a preview of a video that the server can transfer to the computer for viewing so that the user can determine content of the video prior to streaming or playing the video on the computer.

In another aspect of the present invention, the GUI includes a thumbnail control menu for searching the available video by sending signals to the server to control which thumbnails are displayed. One thumbnail control feature includes a "spin" button which randomly changes the displayed thumbnails. Another thumbnail control feature includes a "today's best" button for displaying thumbnails which are defined by a video provider to be associated with a determined best video of the day. Another thumbnail control feature includes a "my videos" button for displaying thumbnails which are associated with a user's profile. Another thumbnail control feature includes an "all videos" button for displaying thumbnails associated with the video playing in the window. Another thumbnail control feature includes a "most popular" button for displaying thumbnails which are defined by a video provider to be associated with a determined most popular video. Another thumbnail control feature includes a "search" button for inputting search criteria for searching for thumbnails which match the search criteria.

In another aspect of the present invention, the GUI includes a video control menu for controlling playing of the video. One video control feature includes a pause button for pausing playing of the video. Another video control feature includes a play button, which preferably appears after selecting the pause button for playing the paused video. Another video control feature includes a forward button for forwarding playing of the video. Another video control feature includes a rewind button for rewinding playing of the video. Another video control feature includes an enlarge button for enlarging the window playing the video.

In another aspect of the present invention, a method is disclosed for playing video available from a server on a GUI. The method includes displaying the GUI with a window and a plurality of thumbnails associated with video available from the server proximate the window. The method further includes receiving a signal indicating selection of a particular thumbnail and playing a video associated with the selected thumbnail in the window. The method can further include streaming or downloading the associated video to the GUI for playing by buffering less than about 10 seconds of video, by buffering greater than ten seconds of video and less than a running length of video, and by downloading an entire running length of the associated video.

In another aspect of the present invention, a system is disclosed for playing video. The system includes a server having video, a computer, a network in communication with the server and the computer for transferring signals therebetween, including signals associated with the video available from the server. The system further includes a GUI configured for operation on the computer having a window to display video and a plurality of thumbnails proximate the window, wherein each thumbnail is associated with video available from the server and is selectable for playing the associated video in the window.

In another aspect of the present invention, a server is disclosed for providing video over a network to a computer for playing the video on the computer. The server is configured to record a plurality of videos for electronic delivery over the network and to associate each video with a thumbnail having a thumbnail image. The server is further configured to deliver the thumbnail images to a graphical user interface (GUI) of the computer and to receive a signal from the GUI indicating selection of one of the thumbnail images. In response to the selection one of the thumbnail images, the server is further configured to transfer the video associated with the selected thumbnail to the GUI for playing the associated video on the computer.

DETAILED DESCRIPTION OF THE PREFERRED EMBODIMENTS

Figure 1:
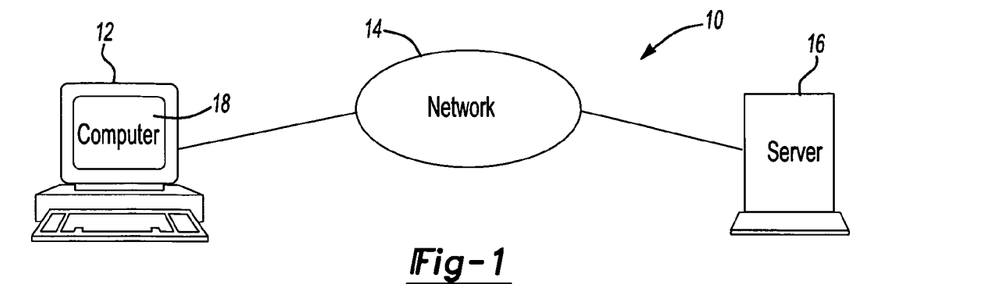
FIG. 1 illustrates a system for playing video in accordance with the present invention.

FIG. 1 illustrates a system 10 for playing video in accordance with one aspect of the present invention. The system includes a computer 12, a network 14, and a server 16. The system 10 is configured such that video is delivered from the server 16 over the network 14 to the computer 12 for playing on a graphical user interface (GUI) 18 of the present invention.

The network 14 can include any electronic means for communicating signals between the computer 12 and the server 16, including a public telephone switching network (PTSN), a wireless network, a cable network, a satellite network, and the like. The computer 12 can include any computing device that has a memory, processor, and/or means for performing computer operations with the network 14. The server can include any type of messaging or hosting server that includes a processor, a memory, and/or means for communication over the network 14.

Video is stored on a memory of the server 16 in an electronic format for subsequent delivery to and playing on the GUI 18. The server 16 can receive the video from any number of content providers, such as television providers, cable providers, satellite providers, and the like. The video found on the server 16 relates to portions of or complete broadcast of television shows and programs, movies, news, or any other animated pictures or images. The server 16 can store the video on a daily basis, such as to record news and other daily events, as well as on a permanent basis, such as to provide on-demand viewing of news, movies, and the like.

The video can be collected, recorded, and stored on the server 16 using various methods. These methods can include employees physically watching news shows, sports programs, movie channels, and the like and recording desired clips or entire copies of the programs. Other methods can include automatically recording programs, movies, news clips, and the like based on predefined criteria entered into a computer or other device which is capable of searching closed captioned video or other descriptive representations of the content of the video to record video having descriptions which match the predefined criteria. Of course, the present invention is not limited to any particular means for recording the video stored on the server 16.

The present invention contemplates other features and devices for the system, including the computer 12 being a hand-held device, a mobile phone, a personal digital assistant (PDA), a television, and the like. The system 10 shown in FIG. 1 is only one exemplary aspect of the present invention and other structures and features are contemplated.

Figure 2:
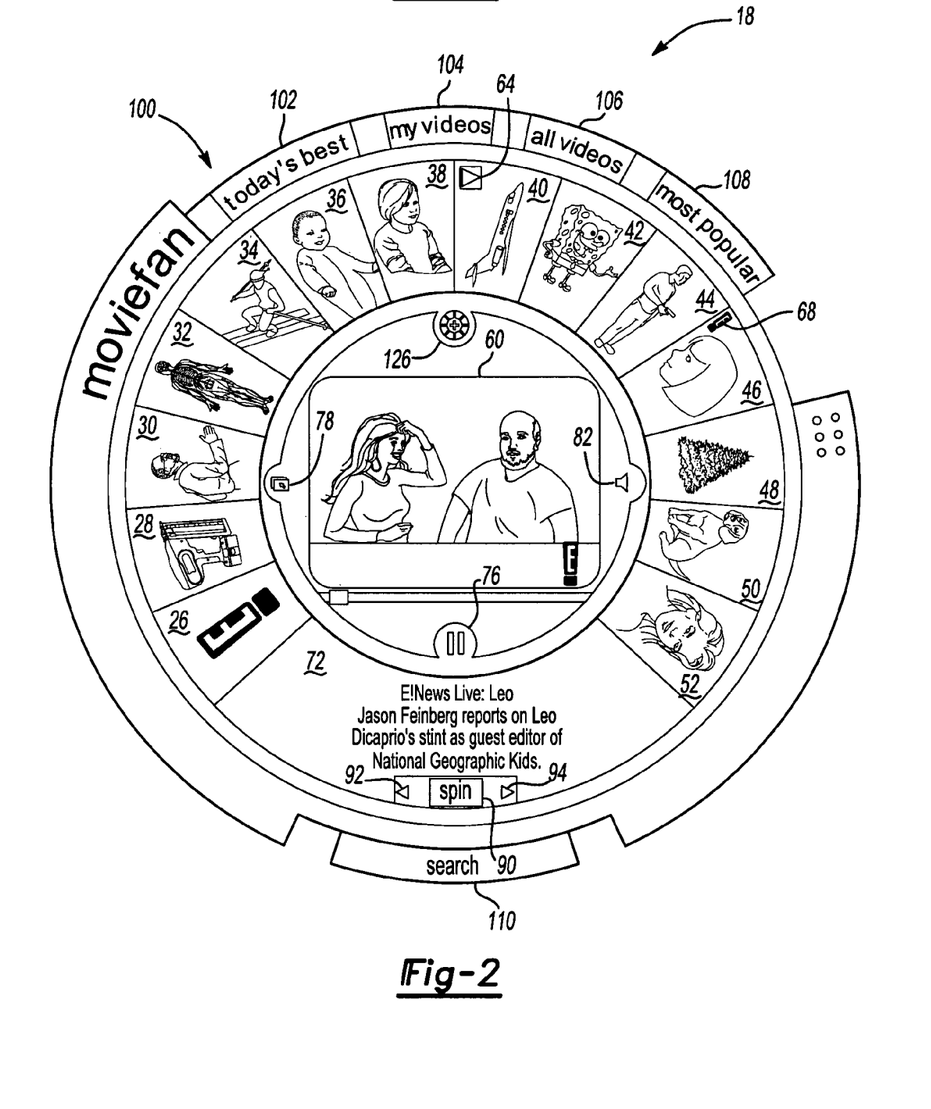
FIG. 2 illustrates a graphical user interface (GUI) to facilitate playing video in accordance with the present invention.

FIG. 2 illustrates the GUI 18 in accordance with one aspect of the present invention for playing video on the computer 12. The GUI 18 is provided by running an application having instructions in accordance with the present invention for playing video on the computer 12. The application can run as a standalone program on the computer 12 and/or it can be incorporated into other user interfaces of other programs running on the computer 12.

The GUI 18 provides a user interface on the screen of the computer 12 that allows users to navigate and control the GUI 18 by using a mouse or other pointer device to point, click, and drag icons, buttons, dialogue boxes, and other data on the screen. Input fields and the like are included for inputting text and other instructions to the GUI 18. The GUI 18 primarily relies on this use of pictures, images, and other icons to represent the input and output functions required for playing the video in accordance with the present invention. This allows the GUI 18 to be more user-friendly and to present content for selectable control in a unique and appealing format. The GUI 18 can operate on any operating system, including Windows, MacOS, Acorn, RISC, OS, NEXTSTEP, Linux, and the like.

The GUI 18 is initialized when the user initializes a GUI software application on the computer 12, such as by clicking on an icon or selecting a program in the operating system of the computer 12. The GUI application initially sends signals to the server 16 to indicate initialization of the GUI application. The server 16 interprets the signals for logging in and authenticating the user. In accordance with one aspect of the present invention, the authentication of the user by the server 16 is used to control access and features of the GUI 18. This allows the server 16 to specify content and the like based on the user, and in particular, based on a services contract for the user. The server 16 can then limit access and track billing charges based on the authenticated user.

The GUI 18 includes a number of selectable thumbnails 26-52 that are displayed around a larger centrally positioned window 60. Each thumbnail 26-52 is a selectable button which displays an image, a graphical representation, or other indicator selected by the server 16 for indicating the content of particular video available from the server 16. The thumbnails 26-52 are associated in this manner so that each thumbnail 26-52 can be selected for playing the associated video in the window 60. In more detail, selection of one of the thumbnails 26-52 causes the GUI 18 to send a request to the server 16 for the video associated with the selected thumbnail 26-52. The server 16 then streams or downloads the desired video to the computer 12 for playing in the GUI 18.

The thumbnails 26-52 can correspond with an animated clip of the video, a single frame of the video, a static image, a textual description, such as a title or short summary of the video, a source designation, such as a channel for the video, and other indicators which may represent the content of the video. The thumbnails 26-52 are shown proximate the window and in circular format around the window to provide an appealing graphical effect. Of course, other configurations are contemplated.

The thumbnails 26-52 provide a preview of the content of a video so that the user can preview a portion of the video without having to download the entire video associated therewith. Preferably, the thumbnails have small files or data sizes to limit the amount of data that is transferred to the computer 12. For animated thumbnails, an optional play button 64 is included on the thumbnail 40 for playing an animated video clip in the thumbnail 40, as opposed to playing the animated video thumbnail 40 in the window 60. Audio sound can be optionally included with playing of the thumbnails 26-52. A rollover feature 68 can also be included in a pop-up window to display a source designation symbol or other data over one of the thumbnails or proximate thereto if the pointer is placed over one of the thumbnails 26-52. Preferably, the rollover feature 68 disappears when the pointer is moved away from the thumbnail 46.

The GUI 18 is configured with software which is compatible with the video format of the video stored on the server 16 so that the video automatically plays in the window 60 with selection of the desired thumbnail 26-52 and without further action by the user. Advantageously, the video is played entirely inside the GUI 18, and does not require a separate pop-up window or video player. The window 60 in which the video plays is generally larger than the thumbnails 26-52 to enhance the viewing size of the video.

Audio and other multi-media features associated with the video are outputted to peripheral devices of the computer 12 during the playing of the video, such as to speaker systems and other electronic devices, such as a television, which may be connected thereto. Closed captioning, logos, and other textual or graphical images can be displayed in the window 60 during playing of the video. In particular, advertising and other messages can be scrolled within a portion for the window 60 during playing of the video, and optionally, similar messaging can be played in the window 60 after the video is completed. In addition, a window 72 can be provided to display a textual description of the video playing in the window 60. The textual description can include information on the source of the video, a synopsis, a running time, and any other data related to the video.

The video playing in the window 60 can be streamed to the computer 12 over the network at different speeds. In some cases, especially to limit downloading times, it can be beneficial to stream the video to the computer 12 by buffering limited portions of the video to the computer 12 and then playing the buffered video. The streaming can be characterized as continuous where only short time segments, generally ten seconds or less, of video are buffered, or as periodic when longer time segments, generally more than ten seconds but less than the running length, of video are buffered. In some cases, especially if downloading time is less important, such as with broadband internet access, the entire running length of the selected video can be downloaded to the computer 12, which can be helpful for playing the downloaded video when not connected to the network or to otherwise store the video on the computer 12 for other operations.

Figure 3:
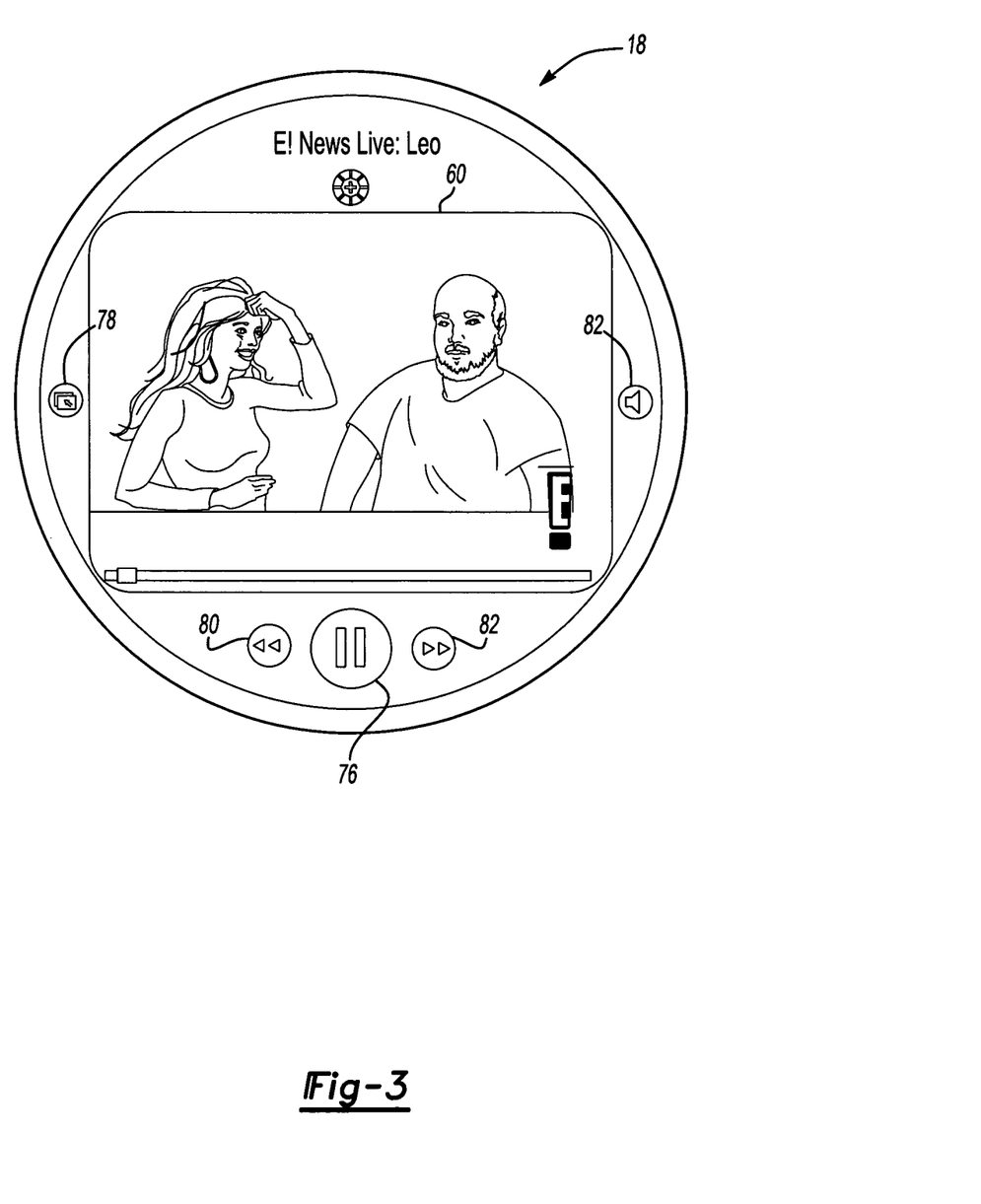
FIG. 3 illustrates the GUI providing an enlarged viewing window for displaying video in accordance with the present invention.

A pause button 76 appears proximate the window 60 to allow the user to pause the playing video. A play button (not shown) appears in place of the pause button 76 if the playing video is paused such that it can be clicked on to resume playing of the video. An enlarge button 78 is also provided to further enlarge the viewing area of the window 16. FIG. 3 illustrates the window 60 with the enlarged viewing area. The enlarged viewing area enlarges the window 60 such that the window covers up the previously displayed thumbnails 26-52. A rewind button 80 and forward button 82 also appear with the enlarged viewing area to provide additional video control. The rewind button 80 is used to rewind the video and the forward button 82 is used to forward the video. A volume button 84 is used to adjust the volume of the video clip. These additional video controls are not shown in FIG. 2, however, it is contemplated that such features may also be include therewith.

The thumbnails 26-52 are initially displayed based on the authentication process described above and can be based on a user profile or other predefined criteria. The present invention desires to provide an improved means for searching the video available from the server 16. In accordance with one aspect of the present invention, the available video is searched by the GUI, thereby controlling which thumbnails 26-52 are displayed.

The present invention includes a number of thumbnail control features which allow the user to change the displayed thumbnails. One such feature is a spin button 90 which is shown in FIG. 2. The "spin" button 90 is a random search feature that automatically changes the thumbnails 26-52 to other videos available from the server. Optionally, a left arrow 92 and a right arrow 94 are included proximate to the "spin" button 90 to provide enhanced control with respect to the changing thumbnails 26-52. The left arrow 92 is used to rotate the images shown in the thumbnails 26-52 in a counter-clockwise direction such that a new image is displayed in the lower-right thumbnail 52. Each click of the left button 92 causes each displayed thumbnail image to shift left one thumbnail position such that the new thumbnail image appears in the lower-right thumbnail 52. The right arrow 94 produces a similar effect in the opposite direction. These features allow the user to surf through the thumbnails 26-52 much like the user would to change channels on a television.

To further control the thumbnails 26-52, the GUI 18 includes a thumbnail control menu 100 having a number of filters that can be used to facilitate the searching, retrieving, and playing of video. The thumbnail control menu 100 is shown as a menu having a grouping of buttons 102-108 proximate a top central portion of the GUI 18, however, the control menu 100 can take any other shape and configuration, and in particular, it need not have such a grouping of buttons. Rather, it may have separate buttons located at different areas on the GUI 18.

The menu 100 is shown with filters which selected with a "today's best" button 102, a "my videos" button 104, an "all videos" button 106, and a "most popular" button 108. The filters correspond with databases created and maintained by the server 16 on a daily or periodic basis. Of course, the present invention is not limited in to the illustrated filters. The GUI 18 communicates the filter request to the server 16 with actuation of the filter buttons 102-108. In response thereto, and the server 16 searches for video which matches the desired video and outputs the thumbnails of the matching video to the GUI 18. Consumption of computer resources are reduced in this manner because the filter processing is done by the server 16 and not the computer 12.

Selection of the "today's best" button 102 prompts the GUI 18 to request thumbnails associated with videos from the server 16 that correspond with a predefined list of videos determined by the server 16 or content controller of the server 16 as being the most important videos for the current day. The "all videos" button 106 requests the server 16 to transfer all the thumbnails associated with the video playing in the window 60 to the GUI 18. This association can be done on many levels, including names of actors/actresses, content type, genre type, and the like. The "most popular" button 108 requests the server 16 to transfer the most watched video of the day as determined by the server 16 based upon the selections made by other subscribers.

Selection of the "my videos" button 104 prompts the GUI 18 to request video that corresponds with particular preferences of the authenticated user. In one aspect of the present invention a user profile is associated with the authenticated user and data related thereto is used by the server 16 to filter the video with selection of the "my videos" button 104. Optionally, the user profile can be automatically generated or updated based on the server 16 tracking and recording the viewing habits of the user. The user profile allows the user to personalize a wide variety of video from different sources and in different categories. Moreover, such personalization allows the user to predetermine the selection of media in advance of that media being published so that the video associated therewith is automatically recorded when it does publish.

Figure 4:
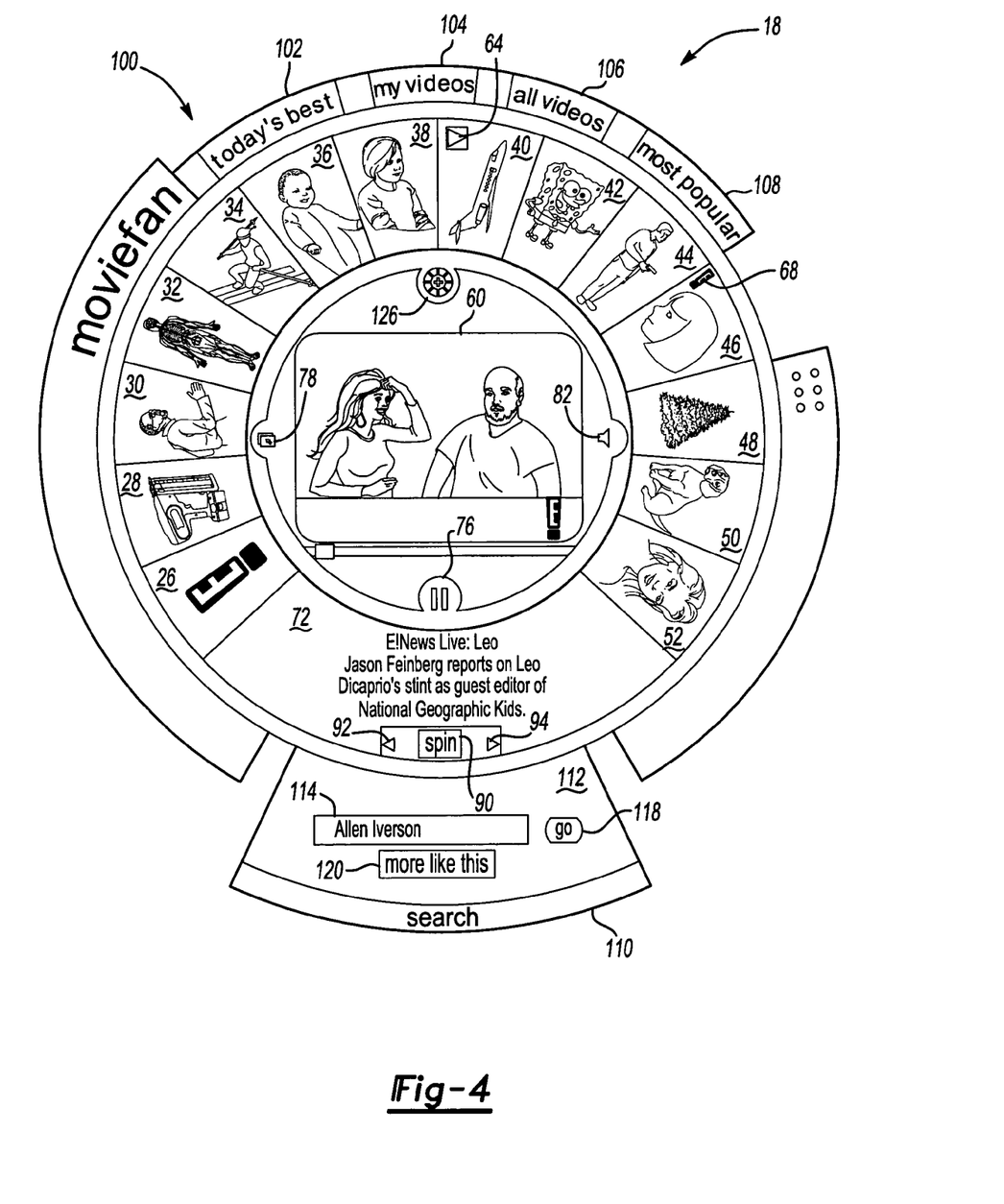
FIG. 4 illustrates the GUI providing an operation menu in accordance with the present invention.

Another thumbnail control option is provided by a search feature which allows the user to search for video. The search feature is provided by a "search" button 110. Selection of the "search" button 110 causes a search menu 112 to appear in the GUI 18, as shown in FIG. 4.

The search menu 112 includes a field 114 for entering a textual description and a "go" button 118. The textual description is inputted into the field 114 and the "go" button 118 is selected to send the textual description to the server 16. The server 16 uses the textual description as a search criteria for finding video stored at the server 16 which matches the search criteria such that the thumbnails associated with the matching video are send back to the GUI 18 and displayed in the thumbnails 26-52 for selection by the user. For example, "Allen Iverson" can be entered in the search field 114 as a search criteria to search for video having a description which includes "Allen Iverson."

A "more like this" button 120 is provided in the search menu 112 to search for additional thumbnails associated with the inputted search criteria that do not exactly match the inputted criteria. With respect to the "Allen Iverson" search criteria, for example, clicking on the "more like this" button 120 would cause thumbnails to appear that are related to "Allen Iverson," such as video having to with basketball in general, with the Philadelphia 76ers, and the like.

Figure 5:
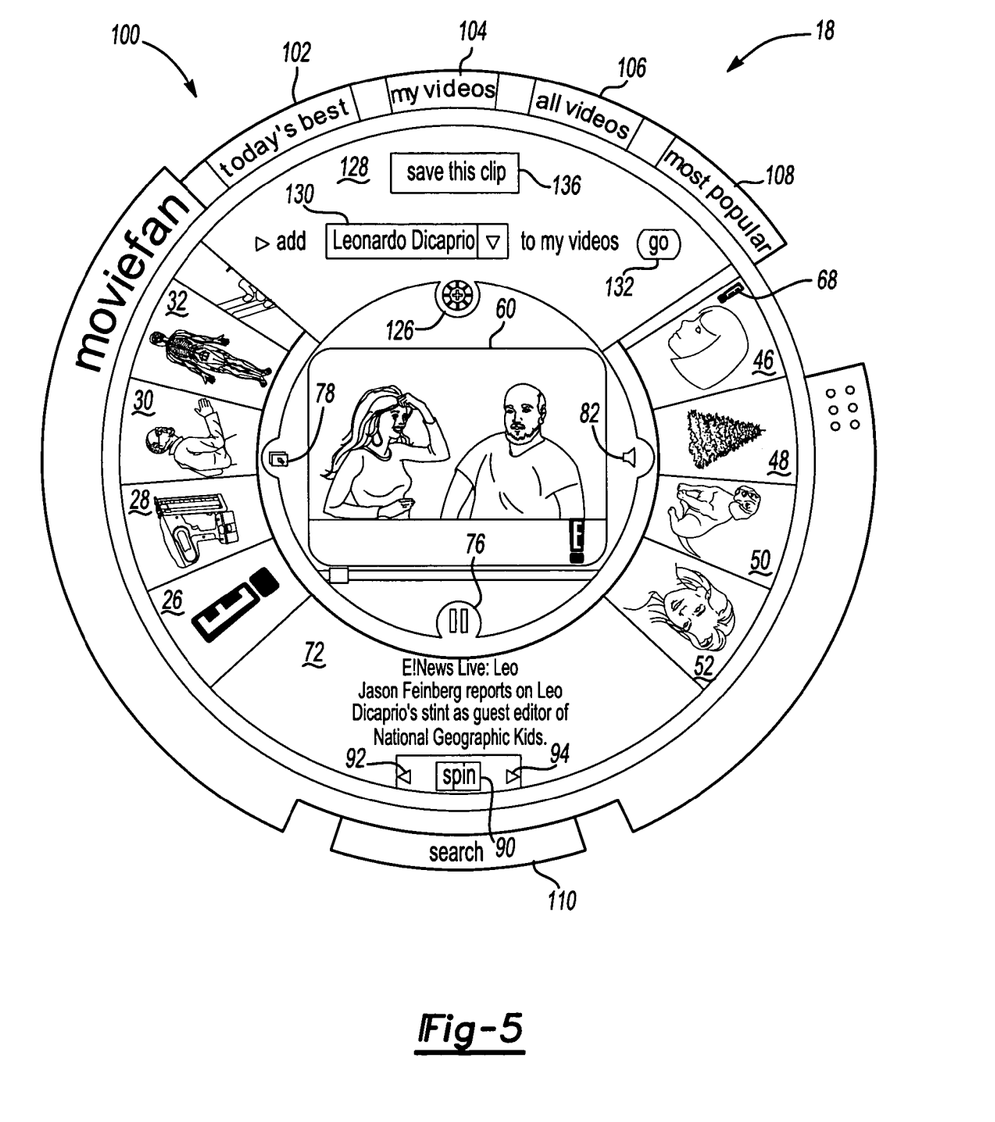
FIG. 5 illustrates the GUI providing a search menu in accordance with the present invention.

Another thumbnail control option is provided by an operation feature which allows the user to input a user command to the GUI 18. The operation feature is provided by an operation button 126. Selection of the operation button 126 causes an input menu 128 to appear in the GUI 18, as shown in FIG. 5.

The input menu 128 includes a drop-down menu 130 and a selectable "go" button 132 for associating a description of the video playing in the window to the "my favorites" filter. The menu 130 includes preference criteria related to the video playing in the window 60. The drop-down menu 130 is populated with one or more descriptions for the video, such as "Leonardo Dicaprio," so that the next time the "my favorites" button 104 is selected, thumbnails are displayed for video associated with "Leonardo Dicaprio." The desired criterion is selected from the menu 130 and added as a filtering step of the "my videos" filter 104. Thereafter, selection of the "my videos" filter 104 returns video having to do with "Leonardo Dicaprio," as well as video having to do with the other customer preferences associated with the user profile.

The input menu 128 includes a "save this clip" button 136 to initiate a download procedure to save the video playing in the window 60 to the computer 12. This is advantageous as the video provided by the server 16 may periodically change such that the user would have to save the video to the computer 12 in order to view it on another day. However, the server 16 could also be configured to archive video and to permit the GUI 18 to initiate filtering and searching of the archived video.

Cable service providers and other content providers could use the present invention as a way to aggregate video from a variety of sources, including cable programming affiliates, and deliver that experience to its customers. The present invention may be a value-added service as part of the internet services, or it could be commercialized as part of a subscription package sponsorship, or advertisements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   outputting, for display from a computing device, a graphical user interface (GUI) for playing video available from a server, the graphical user interface comprising:
   a window arranged to display a current video;
   a plurality of thumbnail cells proximate the window and arranged to display a plurality of thumbnails concurrently with the window displaying the current video, each thumbnail being associated with a different one of a plurality of videos available from a server, each thumbnail being separately selectable for causing playback of its associated video as the current video in the window, and at least one of the thumbnails having a graphical icon displayed thereon in which the graphical icon is selectable to play an animated video clip that is representative of the different one of the plurality of videos associated with the at least one of the thumbnails; and
   a control menu comprising a selectable "left" arrow and a selectable "right" arrow for shifting the thumbnails for display in the thumbnail cells in a left and right direction respectively such that a new thumbnail is presented for display with each shifting thumbnail; and
   outputting, from the computing device, a signal for display of an identifier of a source of the different one of the plurality of videos associated with the at least one of the thumbnails when a cursor is rolled over the at least one thumbnail.

2. The method of claim 1, at least another one of the thumbnails comprising a video frame selected from the different one of the plurality of videos associated with the at least another one of the thumbnails.

3. The method of claim 1, at least another one of the thumbnails comprising a static image that is representative of the different one of the plurality of videos associated with the at least another one of the thumbnails.

4. The method of claim 1, at least another one of the thumbnails comprising a textual description that is representative of the different one of the plurality of videos associated with the at least another one of the thumbnails.

5. The method claim 4, the textual description comprising an indicator of a provider for the different one of the plurality of videos associated with the at least another one of the thumbnails.

6. The method of claim 4, the textual description comprising a title of the different one of the plurality of videos associated with the at least another one of the thumbnails.

7. The method of claim 1, the at least one thumbnail having the graphical icon being selectable to play the animated video clip in the thumbnail.

8. The method of claim 1, further comprising playing one of the plurality of videos automatically as the current video in the window in response to a selection of one of the thumbnails.

9. The method of claim 1, further comprising enlarging the window such that the window at least partially covers a portion of the GUI having the thumbnails.

10. The method of claim 1, the thumbnails being presented in the GUI arranged in an arc around a periphery of the window.

11. The method of claim 1, the control menu comprising a selectable spin button, that when selected, randomly changes the thumbnails presented for display.

12. The method of claim 1, the outputting for display of the source of the video associated with the at least one thumbnail when the cursor is rolled over the at least one thumbnail comprising presenting for display a channel designation for the video.

13. A method comprising:
 outputting, for display from a computing device, a program guide graphical user interface (GUI) having a window and a plurality of thumbnails proximate the window, thumbnails being disposed along an arc circumscribing the window, each thumbnail displaying a video frame selected from a respective associated video of a plurality of videos available from a server, at least one of the plurality of videos being a television program, and each thumbnail having a bottom edge oriented towards the window;
 receiving a signal indicating selection of a particular thumbnail; and
 outputting one of the plurality of videos for display associated with the selected thumbnail in the window.

14. The method of claim 13 further comprising continuously streaming the one of the plurality of videos being outputted, the continuous streaming being characterized by buffering less than about 10 seconds of video.

15. The method of claim 13 further comprising progressively streaming the one of the plurality of videos being outputted, the progressive streaming being characterized by buffering greater than about 10 seconds of video and less than a running length of video.

16. The method of claim 13 further comprising downloading an entire running length of the one of the plurality of videos being outputted.

17. The method of claim 13 further comprising configuring the GUI to play video on a computer.

18. The method of claim 13 further comprising configuring the GUI to play for playing video on a television.

19. The method of claim 13 further comprising receiving the plurality of videos over an internet.

20. The method of claim 13 further comprising receiving the plurality of videos over a cable network.

21. The method of claim 13 further comprising searching and retrieving video by controlling rotation of the thumbnails along the arc circumscribing the window.

22. The method of claim 13, further comprising determining the plurality of thumbnails to display proximate the window based on an authentication of a user.

23. The method of claim 13, further comprising determining the plurality of thumbnails to display proximate the window based on receiving a selection from a thumbnail control menu presented on the GUI.

24. The method of claim 13 further comprising presenting for display the thumbnails in a circular pattern around the window of the GUI.

25. The method of claim 24 further comprising:
 transporting more thumbnails to the GUI than the GUI can simultaneously display; and
 controlling the GUI to rotate the displayed thumbnails to non-displayed thumbnails in order to display one of the non-displayed thumbnails, wherein the thumbnails are rotated about a circumference of a circle enclosing the window.

26. The method of claim 25 further comprising spinning the displayed thumbnails about the circumference of the circle to display one or more of the non-displayed thumbnails, wherein the spinning causes a random display of a grouping selected from all the thumbnails transported to the GUI.

27. The method of claim 13 further comprising automatically playing the one of the plurality of videos associated with the selected thumbnail in the window of the GUI in response to the signal and replacing the selected thumbnail with a new thumbnail.

28. The method of claim 13 further comprising presenting for display non-selected thumbnails while the one of the plurality of videos associated with of the selected thumbnail is playing.

29. The method of claim 13, further comprising causing a source of the associated video to be displayed over top of the thumbnail when a cursor rolls-over the thumbnail.

30. The method of claim 29, further comprising causing display of a textual description describing the associated video when the cursor rolls-over the thumbnail.

31. The method of claim 13, further comprising displaying the GUI with a first radial segment indicative of a searching function and in response to a selection of the first radial segment, displaying a second radial segment comprising a search menu disposed therein, wherein each of the first and second radial segments are bounded by portions of radial lines originating from a point within the window.

32. The method of claim 13, left and right edges of each thumbnail being formed by segments of radial lines originating from a point within the window, and the bottom edge of each thumbnail being formed by the arc circumscribing the window.

33. An apparatus comprising:
 a processor; and
 memory storing instructions that, when executed by the processor, cause the apparatus to:
  provide a program guide graphical user interface (GUI) configured for operation on the apparatus, the GUI comprising a window configured to display video and a plurality of thumbnails proximate the window, wherein each thumbnail is selectable for playing, in the window, an associated with one of a plurality of videos available from a server, wherein at least one of the plurality of videos is television program, and wherein one or more of the thumbnails are selectable to play an animated video clip that is representative of the associated one of the plurality of videos within the thumbnail during playback of video associated with another thumbnail within the window, wherein the thumbnails are disposed along an arc circumscribing the window, and wherein each thumbnail displays an image having a bottom edge oriented towards the window.

34. The apparatus of claim 33, wherein left and right edges of each thumbnail are formed by segments of radial lines originating from a point within the window and the bottom edge of each thumbnail is formed by the arc circumscribing the window.

* * * * *